Figure 1:
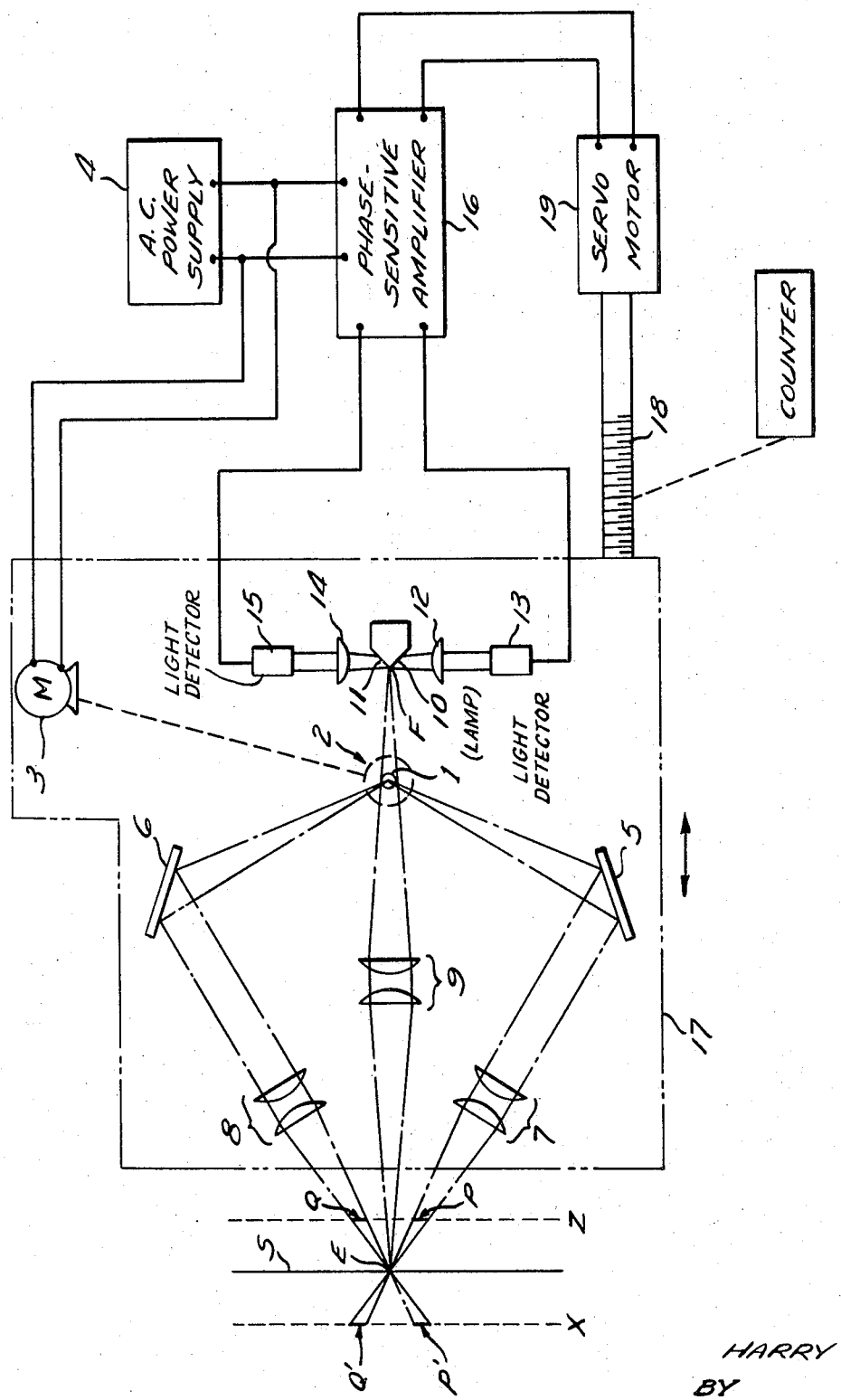

United States Patent

[11] 3,562,538

[72] Inventor Harry W. Mergler
 Cleveland, Ohio
[21] Appl. No. 763,848
[22] Filed Sept. 30, 1968
[45] Patented Feb. 9, 1971
[73] Assignee The Warner & Swasey Company
 Cleveland, Ohio
 a corporation of Ohio

[54] MACHINE TOOL SYSTEM AND OPTICAL GAUGING APPARATUS THEREIN
 13 Claims, 2 Drawing Figs.
[52] U.S. Cl. .................................................. 250/222,
 83/365; 82/34
[51] Int. Cl. ..................................................... B26d 5/34
[50] Field of Search........................................... 250/221,
 222, 215, 234; 356/150, 151, 4, 5; 83/365; 82/34

[56] References Cited
UNITED STATES PATENTS
2,882,475  4/1959  De Neergaard ............. 250/234X
3,021,749  2/1962  Merlen ......................... 356/151
3,041,459  6/1962  Greene, Jr. ................... 250/234X
3,181,401  5/1965  Rice et al. .................... 82/34

Primary Examiner—Walter Stolwein
Attorney—Yount, Flynn and Tarolli

ABSTRACT: In this system an optical gauging apparatus produces two time-displaced light beams which are directed at opposite acute angles to a nonspecular reflecting surface on the workpiece and are focused on the same point. A lens system focused on this same point receives diffuse reflections from the workpiece surface and focuses these reflections at the knife edge intersection of two oppositely-inclined reflecting surfaces. A pair of detectors are positioned to receive the respective reflections from these reflecting surfaces and to operate a phase-sensitive amplifier. The amplifier output signal operates a servomotor to adjust the position of the optical gauging apparatus so as to position the focus of its two light beams on the workpiece surface and also produces a signal for causing another servomotor to adjust the position of a cutting tool with respect to the workpiece.

MACHINE TOOL SYSTEM AND OPTICAL GAUGING APPARATUS THEREIN

This invention relates to a machine tool system and an optical gauging apparatus therein.

A principal object of this invention is to provide a novel and improved optical gauging apparatus which operates in response to diffuse reflection from a nonspecular surface on the article being gauged.

Another object of this invention is to provide such a gauging apparatus in which two time-displaced beams are directed along separate optical paths to the same location for diffuse reflection from a nonspecular surface, and the respective reflections are sensed to determine whether the location to which the beams are directed lies on the surface which produces the diffuse reflections.

Another object of this invention is to provide such an apparatus in which the diffuse reflections are transmitted by an optical system having a first focus at a point on which both time-displaced beams are focused and a second focus at the intersection of two oppositely inclined reflecting surfaces, and in which a pair of detectors are positioned to receive the respective reflections from these reflecting surfaces.

Another object of this invention is to provide an optical gauging apparatus having a novel and improved arrangement for determining the direction of any mispositioning of the article being gauged.

Another object of this invention is to provide such a gauging apparatus in which the mispositioning is automatically corrected by moving the optical gauge toward or away from the article being gauged.

Another object of this invention is to provide a novel and improved optical gauging apparatus which is especially advantageous for use in a machine tool to measure the diameter of the workpiece.

A further object of this invention is to provide a machine tool system having a novel and improved arrangement for controlling the positioning of a cutting tool with respect to a workpiece by sensing the position of the workpiece.

Another object of this invention is to provide a novel and improved machine tool system having a focused optical gauging apparatus for sensing the position of the surface of a workpiece which is to be engaged by a cutting tool, and having provision for moving the gauging apparatus toward or away from the workpiece to bring its focus onto the surface, and having provision for moving the cutting tool toward or away from the workpiece in accordance with information obtained from the gauging apparatus.

Further objects and advantages of this invention will be apparent from the following detailed description of a presently-preferred embodiment thereof with reference to the accompanying drawings which show the present machine tool system and optical gauging apparatus schematically.

Figure 2:
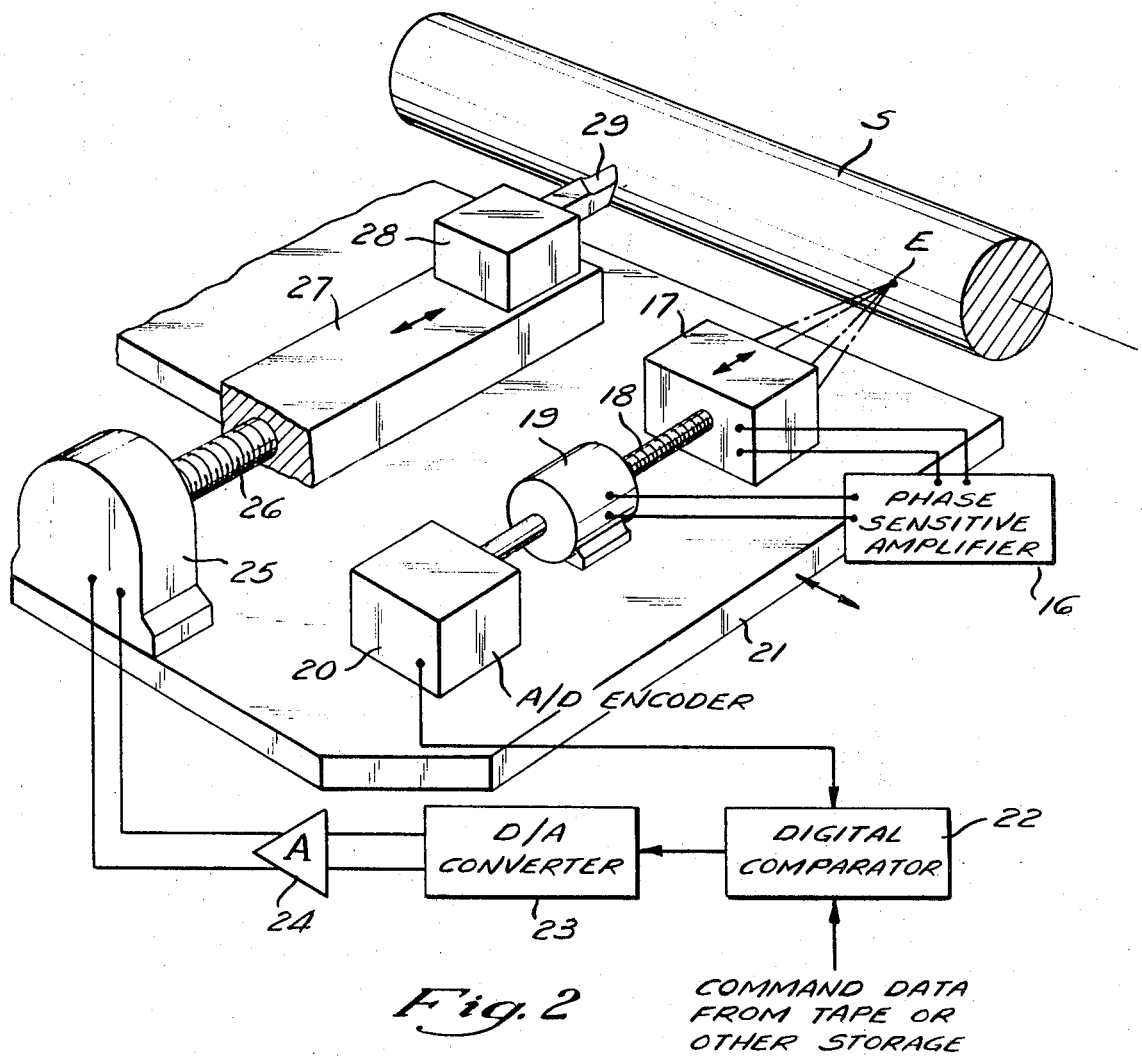

In the drawings:

FIG. 1 illustrates the optical gauging apparatus of the present invention schematically; and FIG. 2 illustrates the machine tool system of the present invention schematically.

Referring to FIG. 1, the illustrated embodiment of the present optical gauging apparatus includes an incandescent lamp 1 or other source of light or other suitable radiation which is interrupted periodically by a mechanical chopper. In the illustrated embodiment this chopper comprises a rotary cylindrical shutter 2 extending around the light source 1 and having a series of evenly-spaced circumferential slots in its periphery for passing light and opaque wall portions between the slots for blocking light. The shutter 2 is rotated at a predetermined speed, as explained hereinafter, by an electric motor 3 which is energized from an AC power supply 4.

First and second plane mirrors 5 and 6 are positioned on opposite sides of the lamp 1 to receive beams of light from the latter which are 180° out of phase with respect to each other. That is, while a slot in the chopper shutter 2 is positioned to pass light from the lamp 1 to the mirror 5, an opaque wall portion of the chopper shutter is positioned to block light from the lamp 1 to the other mirror 6, and vice versa. The beams which are received by mirror 5 do not overlap in time the beams which are received by mirror 6, and preferably there is an appropriate time separation between them. The frequency or repetition rate of the light beams received by mirrors 5 and 6, respectively, is determined by the speed of the shutter motor 3 which in turn depends on the frequency of the power supply 4. Preferably, the repetition rate of the light beams (i.e., the chopper frequency) is equal to the frequency of the power supply 4, so that, for example, a light beam is received by mirror 5 during each positive half-cycle of the power supply 4 and a light beam is received by mirror 6 during each negative half-cycle of the power supply.

The plane mirror 5 is part of a first optical system which also includes a pair of planoconvex lenses 7, preferably dual achromatic lenses, positioned with their convex surfaces toward each other and arranged to receive the light reflected from mirror 5 and to focus it on a predetermined point E. This point E is positioned at the desired location of a point on the nonspecular light-reflecting surface S on the article being gauged, such as a workpiece in a machine tool, as explained hereinafter, when this article is properly positioned with respect to the present optical gauge That is, if there is no error in the position of the surface of the article being gauged with respect to the present optical gauge, or vice versa, point E which is at the focus of the light passed by mirror 5 and lenses 7, will lie on the surface S of the article. The beam of light passed by lenses 7 is directed at an acute angle to the surface S.

The other plane mirror 6 is part of a second optical system which also includes a pair of planoconvex lenses 8, preferably dual achromats, positioned with their convex surfaces toward each other and arranged to receive the light reflected from mirror 6 and focus it on the same point E. The beam of light transmitted by lenses 8 is directed at an acute angle to surface S which is equal and opposite to that of the beam directed by lenses 7. It should be remembered that each light beam passed by this second optical system 6, 8 is time-displaced 180° from the light beam passed by the first optical system 5, 7.

If desired the light source 1, shutter 2 and plane mirrors 5 and 6 may be replaced by two separate point sources of light which are flashed on and off in alternate sequence (i.e., 180° out of phase) and whose beams are directed to the lenses 7 and 8, respectively.

The surface S is a nonspecular, light reflecting surface which is not smooth enough to act as a perfect reflecting surface. Instead, it has sufficient irregularity or roughness to provide nonspecular or diffuse reflection of the incident beams of light.

The present invention also has an optical system for receiving and focusing diffuse reflection from the surface S. This optical system comprises a pair of achromatic lenses 9 positioned midway between the respective beams of light passed by lenses 7 and lenses 8. Lenses 9 at one side thereof have a first focus on the aforementioned point E, and on the opposite side thereof, they have a second focus at a point F. The light transmitted by lenses 9 is displaced from the shutter 2 in a direction perpendicular to the plane of the drawing so that the shutter does not intercept the light transmitted by lenses 9. The second focal point F is located at the knife-edge intersection of two oppositely inclined, plane, silvered reflecting surfaces 10 and 11.

The light reflected from surface 10 preferably is focused by a planoconvex lens 12 on an electrooptical detector 13, which produces an electrical output signal whose amplitude is proportional to the amount of light impinging on it.

The light reflected from surface 11 is focused by a planoconvex lens 14 on an electrooptical detector 15, which produces an electrical output signal proportional to the amount of light which it receives.

The detectors 13 and 15 are connected to the input of a conventional phase-sensitive amplifier 16 which also is connected to the AC power supply 4 to provide a phase reference signal which is 90° out of phase with respect to the power supply. The amplifier 16 compares the instantaneous amplitudes of the output signals from detectors 13 and 15, and it also compares the phase of the detector output signals with respect to the aforementioned phase reference signal. Since the light beams transmitted by the respective lens pairs 7 and 8 against the surface S have a predetermined phase relationship with respect to the AC power supply 4, it will be evident that, in effect, the amplifier 16 determines the phase relationship of the detector output signals with respect to these light beams. The output signal of the amplifier 16 has a magnitude proportional to the instantaneous difference between the output signals of detectors 13 and 15, and a time polarity determined by the phase relationship between the detector output signals and the aforementioned reference phase signal.

In the operation of this gauge, when the focus E lies on the surface S to be gauged, the diffuse reflection passed by the lenses 9 will be focused on point F, so that at any given instant the detectors 13 and 15 will be energized equally, regardless of whether the diffuse reflection is from the impinging beam which passed through lenses 7 or from the beam which passed through lenses 8. Under these circumstances, the amplifier 16 will produce no output signal.

However, assume that the surface S is now at position Z, so that the focus E is behind this surface. Under these conditions the light beam passed by lenses 7 will impinge on the surface S at P, and then 180° later the light beam passed by lenses 8 will impinge on the surface S at Q. Virtually all of the diffuse reflection from P passing through lenses 9 will impinge on the reflective surface 11 to energize the detector 15, and then 180° later virtually all of the diffuse reflection from Q passing through lenses 9 will impinge on the reflective surface 10 to energize the detector 13.

The amplifier 16 will sense whether the signal from detector 13 predominates during the positive or negative half-cycle for the power supply (and the same for the signal from detector 15), thereby indicating whether the surface S is in front of or behind the focal point E. In effect, the amplifier 16 determines whether the signal from detector 13 was caused by the beam of light which was transmitted by lenses 7 or the beam transmitted by lenses 8, and the same as to the signal from detector 15, and the time polarity of the output signal from amplifier 16 is controlled accordingly.

Conversely, if the surface S is positioned behind the focal point E, as indicated at X, the beam which passes through lenses 7 will impinge on surface S at Q', and then 180° later, the beam passed by lenses 8 will impinge on surface S at P'. Virtually all of the diffuse reflection from Q' passing through lenses 9 will impinge on the reflective surface 10 to energize detector 13, and then 180° later, virtually all of the diffuse reflection from P' passing through lenses 9 will impinge on the reflective surface 11 to energize detector 15.

Again, the amplifier 16 will produce an output signal whose time polarity depends upon which detector output signal whose time polarity depends upon which detector output signal predominates during a positive half-cycle (for example) of the power supply.

From the foregoing, it will be evident that the amplifier 16 responds to the detectors 13 and 15 to produce an output signal whose time polarity depends upon the direction of the displacement of the focal point E with respect to the surface S on the workpiece being gauged.

Referring to FIG. 2, in its preferred embodiment the machine tool system of the present invention embodies the FIG. 1 optical gauging apparatus, the optical parts of which are enclosed in a housing 17 slidably mounted on the saddle 21 in a machine tool. The saddle 21 is mounted for movement longitudinally of the bed of the machine, as indicated by the arrows, parallel to the conjoint axes of the workpiece W and the rotary spindle (not shown) which supports it. The housing 17 of the optical gauging apparatus is movable across the saddle 21 toward and away from the workpiece (perpendicular to the direction in which the saddle 21 is movable) by means of a lead screw 18 driven by a two-phase servomotor 19, which is fixed to the saddle.

The servomotor 19 is energized by the output signal from the phase sensitive amplifier 16. Whenever the optical gauging apparatus determines that its focal point E does not lie on the surface S of the workpiece, as described, the output signal of amplifier 16 will be of a time polarity effective to energize the servomotor 19 in a direction for moving the housing 17 of the optical gauging apparatus toward the position in which the focal point E will lie on the workpiece surface S. When the optical gauging apparatus reaches the position in which the output signal from amplifier 16 is substantially zero, at which time the focal point E will lie on the surface S, the motor 19 will stop.

The shaft of servomotor 19 is connected to the input of an analog-to-digital encoder 20, which acts as a counter to produce a digital representation of the angular rotational position of the lead screw 18. In one practical embodiment, this counter 20 can be preset to read zero when the focal point E of the optical gauging apparatus is focused on the spindle axis and can be calibrated to read the workpiece diameter when the focal point E is brought to the surface S of the workpiece. That is, the digital output signal from encoder 20 designates in absolute terms the workpiece diameter when the motor-driven lead screw 18 has positioned the optical gauging apparatus with its focal point E lying on the external surface S of the workpiece.

It will be noted that the portion of the system which provides the encoder output signal has a relatively low inertia, because the optical gauging apparatus is relatively light and can be positioned with great accuracy by a relatively small servomotor.

The digital output signal from encoder 20 is applied as one input signal to a digital comparator 22. Command data from a control tape or other storage medium provides a second digital input signal to the comparator 22, which compares it against the encoder output signal to produce a difference signal which is applied as a digital correction signal to the input of a digital to analogue converter 23. The analogue output signal from the D/A converter 23, after amplification by an amplifier 24, is applied to a servomotor 25 which drives a lead screw 26. Lead screw 26 drivingly engages a cross slide 27 which is mounted for movement across the saddle 21 toward or away from the workpiece, parallel to the movement of the optical gauging apparatus. The cross slide 27 carries a tool holder 28 in which a cutting tool 29 is mounted for cutting engagement with the workpiece. In FIG. 2, the distance between the focal point E of the optical gauging apparatus and the cutting tool has been shown greatly exaggerated for ease of illustration. In actual practice, this distance is kept small by positioning the optical gauging apparatus in housing 17 on the opposite side of the workpiece W from the tool 29.

In the operation of this system, the output from the encoder 20 tells the workpiece diameter, and therefore the position of the workpiece surface S with respect to the spindle axis. This data, combined with the command data from the tape which tells the required position for the cutting tool 20, controls the final position of the tool with respect to the spindle axis. It will be noted that the control signal loop for the cutting tool does not require a feedback signal from the lead screw 26 for the relatively high inertia cross slide 27, tool holder 28 and tool 29, so that the inertia of the tool positioning mechanism is not a factor in the accuracy of the control signal input to the servomotor 25 for positioning the tool.

While a particular presently-preferred embodiment of the present invention has been described in detail, it is to be understood that various modifications, omissions and refinements which depart from the disclosed embodiment may be made and the gauging apparatus may be used for purposes other than to gauge the size of a workpiece and to control the position of a cutting tool in a machine tool, all without departing from the scope of this invention. For example, if desired, in the optical gauging apparatus, either the mirror 5 and lenses 7 or the mirror 6 and lenses 8 may be omitted, and still the apparatus will determine the magnitude and direction of any mispositioning of its focus E with respect to the surface S.

I claim:

1. An optical gauging apparatus for gauging an article having a nonspecular reflecting surface comprising:

means for producing periodically interrupted beams of radiation and for directing said beams to a predetermined location corresponding to a location on the surface to be gauged when the latter is in the desired position and including a radiation source, a rotary shutter having radiation-transmitting portions thereon, a motor driving said shutter, and an AC power supply connected to said motor to energize the latter and thereby to cause the radiation beams to be passed by the shutter in a predetermined phase relationship with said AC power supply;

means positioned to receive diffuse reflections from said surface and for directing said diffuse reflections in accordance with the position of said surface with respect to said predetermined location and including lens means having at one side thereof a first focus at said predetermined location and at the opposite side thereof a second focus, and means providing a pair of oppositely inclined reflecting surfaces which intersect at said second focus;

means for sensing the reflections directed by said last mentioned positioned means including a pair of radiation-sensitive detectors positioned respectively to receive the reflections from said oppositely inclined reflecting surfaces;

means responsive to the sensed reflections for producing a signal in accordance with the direction of said nonspecular reflecting surface from said predetermined location and including a phase-sensitive amplifier connected to said detectors and operative to determine the phase relationship between the respective reflections received by the detectors and the beams of radiation directed to said predetermined location; and means for applying said AC power supply to said amplifier for phase comparison with the detector signals received by the latter.

2. An optical gauging apparatus for gauging an article having a nonspecular reflecting surface comprising:

means for producing repetitively two separate time-displaced beams of light including a light source, a rotary shutter having light-transmitting slots which pass the two beams of light from opposite sides of the light source 180° out of phase with respect to one another, a motor driving said shutter, an AC power supply, and means for energizing said motor from said power supply, means for directing said beams along separate optical paths onto said surface at opposite acute angles respectively and for focusing said beams at a predetermined point on the desired position of said surface for diffuse reflection of said time-displaced beams from said surface;

light-transmitting optical means positioned midway between the paths of said two time-displaced beams to receive diffuse reflection from said surface, said optical means having a first focus at one side thereof at said predetermined point and having a second focus at the opposite side thereof;

means for sensing any nonsymmetry of the time-displaced diffuse reflections with respect to said second focus and including means providing a pair of oppositely inclined reflecting surfaces which converge to an intersection at said second focus, and a pair of light sensors positioned respectively to receive the light reflected from said reflecting surfaces;

means connnected to said sensors for producing a signal whose polarity depends on the direction of the mispositioning of said predetermined focus point with respect to the article and including a phase sensitive amplifier;

said amplifier having means therein for comparing the phase of the signals from said detectors with said AC power supply; and means for applying said AC power supply to said amplifier.

3. In a machine tool system having a slide supporting a cutting tool for movement toward and away from a workpiece, and motor means for driving said slide, the improvement which comprises; an optical gauging apparatus having means for sensing the size of a workpiece and including means for adjustably positioning said optical gauging apparatus at a predetermined distance from the workpiece, and means for controlling the energization of said motor means for the tool-supporting slide in accordance with the sensed size of the workpiece as determined by the position of said optical gauging apparatus; said apparatus further including means for producing a signal designating the size of the workpiece, and means for comparing said signal against a record control signal for said motor means for the tool-supporting slide.

4. A system according to claim 3, wherein said means for adjustably positioning said optical gauging apparatus comprises a servomotor drivingly coupled to said optical gauging apparatus for moving the latter toward or away from the workpiece, depending upon the direction of operation of the servomotor, and said means for producing a signal representation of the size of the workpiece is driven by said servomotor.

5. A system according to claim 4, wherein said optical gauging apparatus comprises: means for producing beams of radiation and for directing said beams to a predetermined location corresponding to a location on the surface of the workpiece to be gauged when the optical gauging apparatus is correctly positioned with respect to said surface in the desired position, means positioned to receive diffuse reflections from said surface and for directing said diffuse reflections in accordance with the position of said surface with respect to said predetermined location, means for sensing the reflections directed by said last-mentioned means, and means responsive to the sensed reflections for producing a signal in accordance with the direction of said surface from said predetermined location.

6. A system according to claim 5, wherein: said means positioned to receive diffuse reflections from said surface and for directing said diffuse reflections comprises lens means having at one side thereof a first focus at said predetermined location and at the opposite side thereof a second focus, and means providing a pair of oppositely inclined reflecting surfaces which intersect at said second focus; and wherein, said means for sensing the reflections comprises a pair of radiation-sensitive detectors positioned respectively to receive the reflections from said last-mentioned reflecting surfaces.

7. A system according to claim 6, wherein:

said means for producing beams of radiation interrupts said beams periodically; and said means responsive to the sensed reflections comprises a phase-sensitive amplifier connected to said detectors and operative to determine the phase relationship between the respective reflections received by the detectors and the beams of radiation directed to said predetermined location, said phase-sensitive amplifier having its output connected to the input of said servomotor to control the latter's direction of operation in accordance with said phase relationship.

8. A system according to claim 4, wherein said optical gauging apparatus comprises:

means for producing repetitively two separate time-displaced beams of light;

means for directing said beams along separate optical paths onto the surface of said workpiece at opposite acute angles respectively and for focusing said beams at a predetermined point on the desired position of said surface for diffuse reflection of said time-displaced beams from said surface;

light-transmitting optical means positioned midway between the paths of said two time-displaced beams to receive diffuse reflection from said surface, said optical means having a first focus at one side thereof at said predetermined point and having a second focus at the opposite side thereof; and means for sensing any nonsymmetry of the time-displaced diffuse reflections with respect to said second focus.

9. A system according to claim 8, wherein said last-mentioned means comprises means providing a pair of oppositely inclined reflecting surfaces which converge to an intersection at said second focus, and a pair of radiation sensors positioned respectively to receive the radiation reflected from said reflecting surfaces.

10. A system according to claim 9 and further comprising means connected to said sensors for producing a signal whose time polarity depends upon the direction of the mispositioning of said predetermined focus point with respect to the workpiece surface.

11. A system according to claim 10 wherein said last-mentioned means comprises a phase-sensitive amplifier having its output connected to the input of said servomotor to control the latter's direction of operation in accordance with the time polarity of the output signal from the amplifier.

12. A system according to claim 11, and further comprising:
a support mounted for movement toward and away from the workpiece and carrying said means for producing beams of light, said means for directing and focusing said beams of light, said light-transmitting means, said means providing said reflecting surfaces and said sensors; and said servomotor being coupled to said support to shift the latter toward and away from the workpiece so as to bring said predetermined focus point into a position lying on said nonspecular reflecting surface of the article.

13. A system according to claim 5, wherein said means for producing a signal representation of the size of the workpiece is preset to produce a zero signal when said optical gauging apparatus is positioned to direct said beams to a location on the axis of the workpiece and is operative to produce a signal proportional to the displacement of said optical gauging means from its zero signal position to thereby represent the size of the workpiece.